June 11, 1940.  R. W. WAGNER  2,204,335
MOUNTING FOR MOWER MECHANISM
Filed May 15, 1939  4 Sheets-Sheet 1
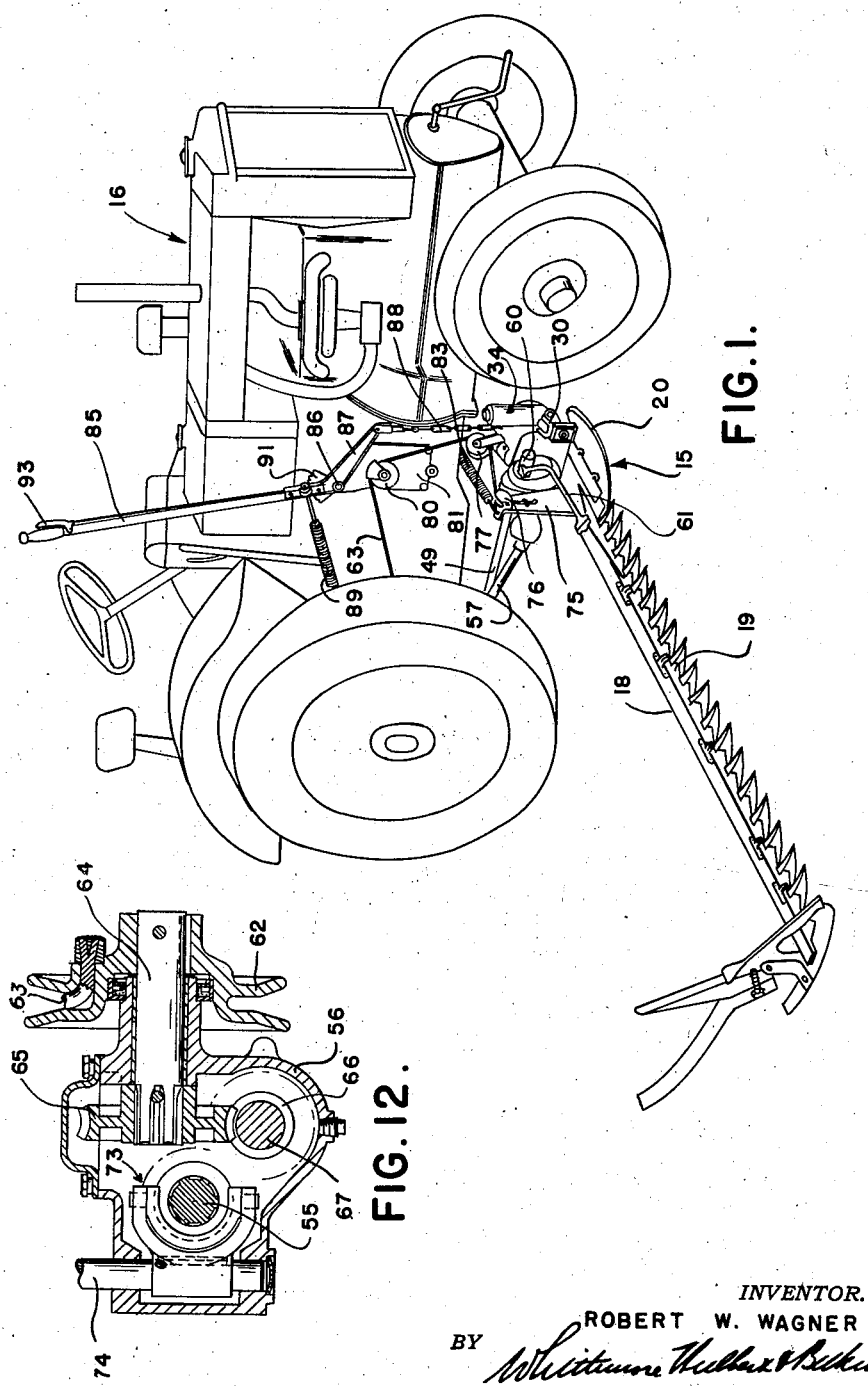
INVENTOR.
ROBERT W. WAGNER
BY
ATTORNEYS June 11, 1940.  R. W. WAGNER  2,204,335
MOUNTING FOR MOWER MECHANISM
Filed May 15, 1939   4 Sheets-Sheet 2
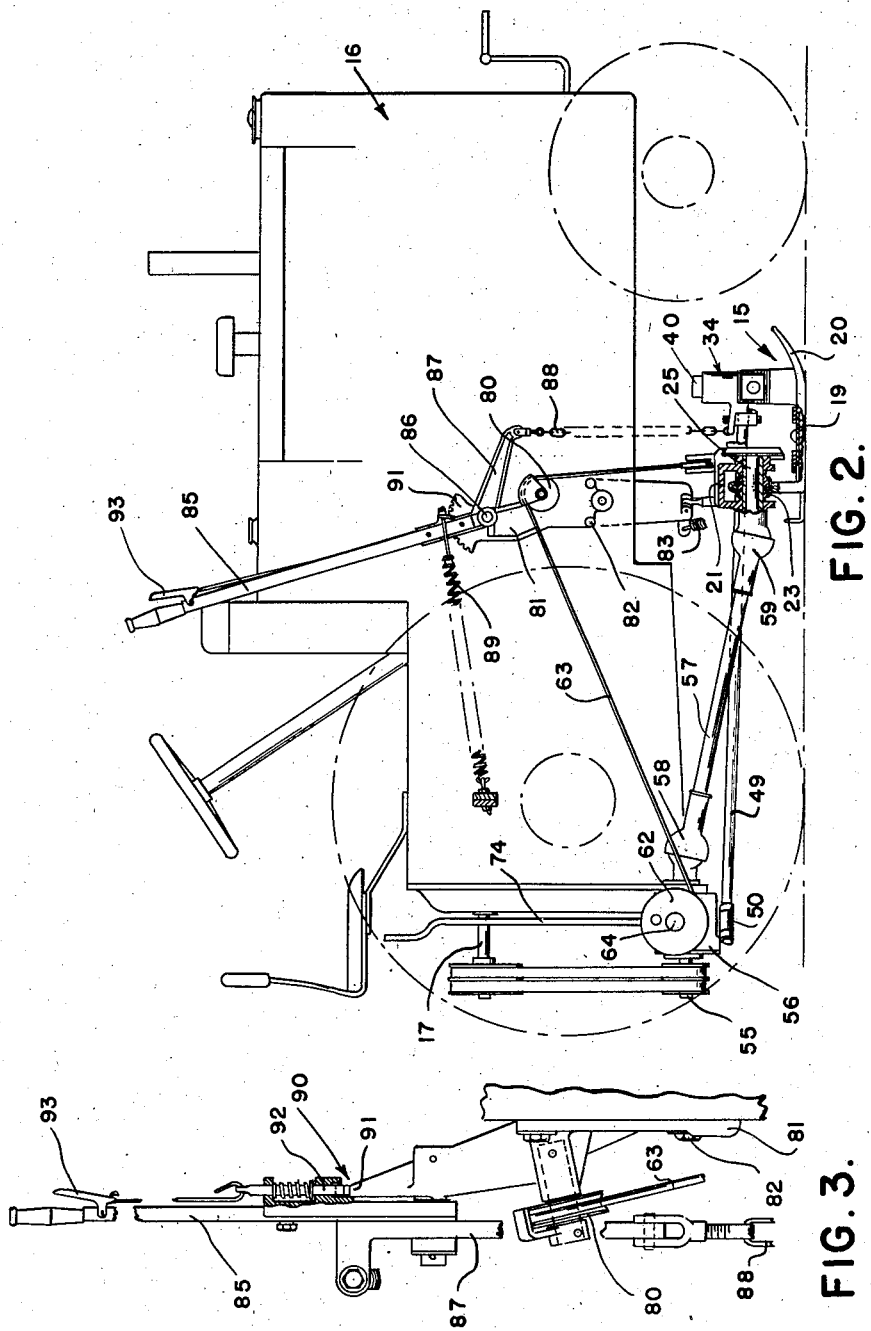
INVENTOR.
ROBERT W. WAGNER
BY
ATTORNEYS

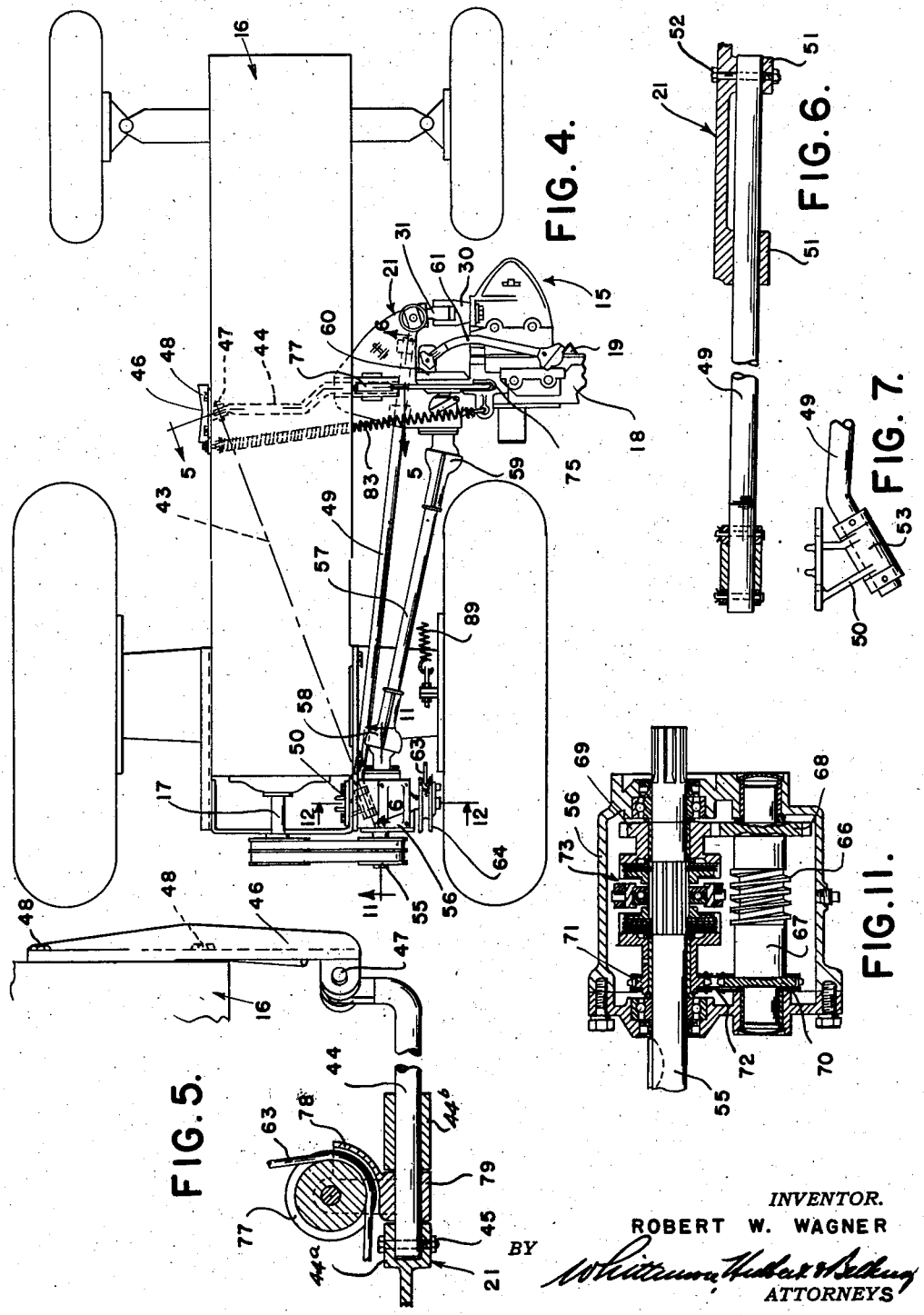

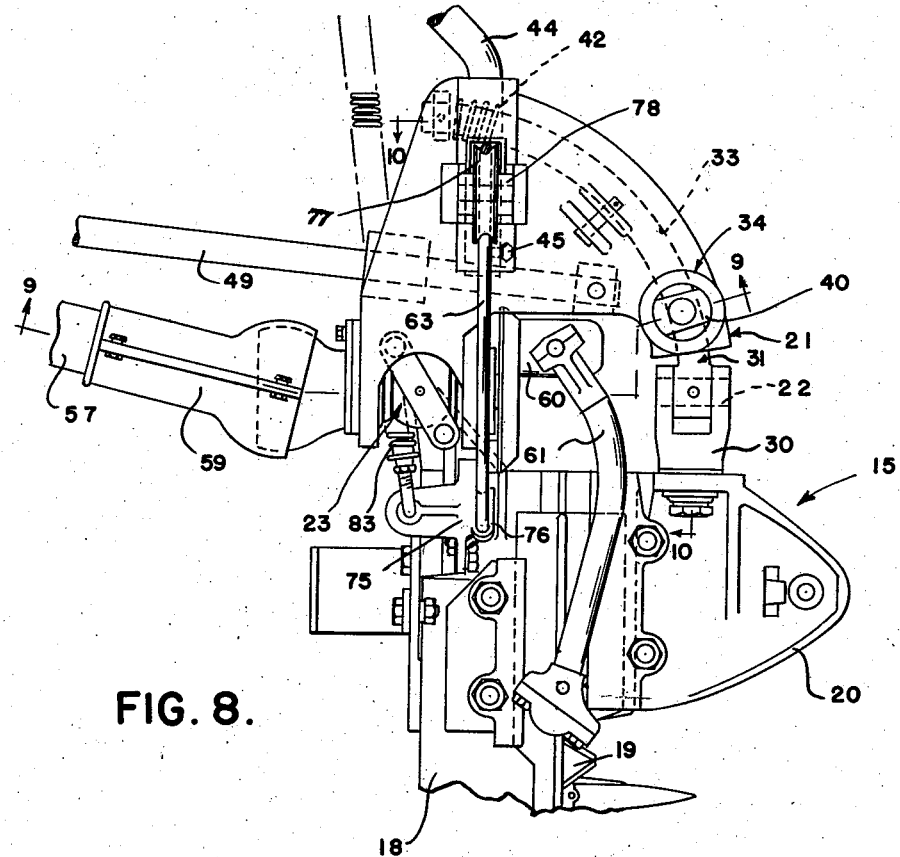
FIG. 8.
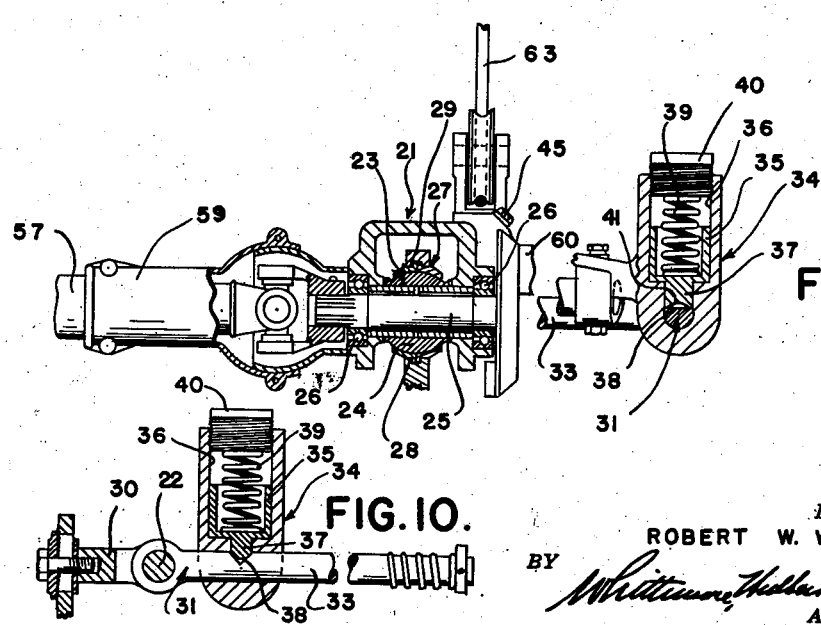
FIG. 9.
FIG. 10.
INVENTOR.
ROBERT W. WAGNER

Patented June 11, 1940

2,204,335

UNITED STATES PATENT OFFICE 2,204,335

MOUNTING FOR MOWER MECHANISM

Robert W. Wagner, Detroit, Mich., assignor to Detroit Harvester Company, Detroit, Mich., a corporation of Michigan Application May 15, 1939, Serial No. 273,742

18 Claims. (Cl. 56—25)

This invention relates generally to attachments for vehicles and refers more particularly to mower attachments of the type employed in connection with tractors.

It is one of the principal objects of this invention to provide an improved mower attachment composed of a relatively few simple parts capable of being inexpensively manufactured, assembled and readily installed on tractors of conventional design.

In addition to the foregoing, the present invention contemplates improved means for supporting the weight of the mower arm from the tractor and for adjusting the height of the mower arm relative to the ground to provide for varying the extent of cut.

A further object of the present invention which contributes materially in affording the results set forth in the preceding paragraph resides in the provision of a mower attachment wherein several of the parts thereof form a unitary compact sub-assembly rendering it practical to manufacture the mower attachment on a production basis at a cost considerably lower than mower attachments heretofore produced.

Another object of the present invention consists in the provision of a mower attachment so constructed as to permit the same to be easily manipulated from the operator's position on the tractor and having the several parts thereof designed in a manner to withstand considerable hard usage over a long period of time without damage.

A further advantageous feature of the present invention resides in the provision of a simple improved mounting of the mower attachment on the tractor characterized in that it not only provides a strong and durable construction but, in addition, affords relatively easy raising and lowering of the mower arm.

The foregoing, as well as other objects, will be made more apparent as this description proceeds, especially when considered in connection with the accompanying drawings, wherein:

Figure 1 is a perspective view of a typical tractor having a mower attachment constructed in accordance with this invention;

Figure 2 is a side elevational view, partly in section, of the construction shown in Figure 1;

Figure 3 is a fragmentary elevational view of a part of the mower attachment;

Figure 4 is a plan view of the construction shown in Figure 2;

Figure 5 is a sectional view taken substantially on the plane indicated by the line 5—5 of Figure 4;

Figure 6 is a sectional view taken substantially on the plane indicated by the line 6—6 of Figure 4;

Figure 7 is a fragmentary elevational view of one of the attaching brackets employed in the construction;

Figure 8 is an enlarged fragmentary elevational view of a portion of the mower attachment;

Figure 9 is a sectional view taken substantially on the plane indicated by the line 9—9 of Figure 8;

Figure 10 is a sectional view taken substantially on the plane indicated by the line 10—10 of Figure 8;

Figure 11 is a sectional view taken substantially on the plane indicated by the line 11—11 of Figure 4;

Figure 12 is a sectional view taken substantially on the plane indicated by the line 12—12 of Figure 4.

In Figure 1 of the drawings, I have illustrated my improved mower attachment 15 in connection with a tractor 16 of conventional design having the usual power take-off shaft 17 projecting from the rear end of the tractor. The power take-off shaft is, of course, driven by the engine of the tractor and, in the present instance, supplies the power for operating the mower attachment 15.

The mower attachment 15 is provided with an arm 18 supporting a blade 19 for reciprocation relative to the arm and secured at its inner end to a shoe 20, shown particularly in Figure 8 as pivotally connected to a bracket 21 by means of the pivot pin 22 and the universal joint 23. It may be pointed out at this time that the connection between the shoe 20 and the bracket 21 is such as to permit the mower arm 18 to swing throughout an arc lying in a vertical plane and also throughout an arc lying in a horizontal plane. Referring more in detail to this connection, it will be noted from Figure 9 that the universal joint connection 23 comprises a bearing member 24 having a spherical surface and supported on a driven shaft 25 having the opposite ends thereof journalled in bearings 26 which, in turn, are supported in axial spaced relationship in the bracket 21. The spherical surface of the bearing member 24 is received in a correspondingly-shaped cap 27 having one section 28 formed integral with the shoe 20 and having a cooperating section 29 secured to the section 28 by means of suitable fastener elements. The above construction provides the universal joint 23 and not only permits horizontal swinging movement of the mower arm 18 but, in addition, renders it possible to swing the mower arm vertically relative to the bracket 21.

The pivotal connection 22 is shown in Figure 8 as comprising a bracket 30 secured to the shoe 20 forwardly of the universal joint 23 and having a bifurcated portion adapted to receive one end of an arm 31. The end aforesaid of the arm 31 is pivotally connected to the bifurcated portion of the bracket 30 by means of the pin 22 having its axis extending horizontally so as to permit the vertical movement aforesaid of the mower arm 18. In order for the connection 22 to permit horizontal swinging movement of the mower arm 18 about the universal joint 23, the arm 31 is provided with an arcuate portion 33 slidably mounted within a correspondingly-shaped bore formed in the bracket 21. The arcuate portion 33 of the arm 31 and the bore in the bracket 21 are correspondingly curved about the center of the universal joint 23 so that horizontal swinging movement of the mower arm 18 about the universal joint merely effects a sliding movement of the portion 33 of the arm 31 in the bore of the bracket 21.

The mower arm 18 is normally maintained in its operative position substantially perpendicular to the longitudinal center line of the tractor by means of a spring pressed detent 34. Upon reference to Figures 9 and 10, it will be noted that the detent 34 comprises a plunger 35 reciprocably mounted in a vertically extending bore 36 formed in the bracket 21 and having a reduced portion 37 adapted to engage in a substantially V-shaped notch 38 formed in the arm 31 in such a position that when the reduced portion is engaged therewith, the mower arm 18 is located in operative relationship. The reduced portion 37 is normally urged in frictional engagement with the arm 31 by means of a coil spring 39 housed in the bore 36 with one end engaging the plunger 35 and with the opposite end engaging an abutment 40 threaded in the upper end of the bore 36.

The above arrangement is such that in the event the mower arm 18 strikes an obstruction, the reduced portion 37 of the plunger 35 is cammed upwardly against the action of the spring 39 to release the mower arm and permit the same to be swung in a rearward direction about the axis of the universal joint 23. As a result, damage to the mower arm is prevented since the operator merely stops the tractor and removes or avoids the obstruction by raising the mower arm 18. As soon as the danger of the obstruction is removed, the mower arm may be swung manually back to its operative position wherein the reduced portion 37 of the plunger snaps into the V-shaped slot 38. It may be pointed out at this time that the reduced portion 37 is also substantially V-shaped to correspond to the cross sectional contour of the slot 38 and is shown in Figure 9 as having a transversely extending recess 41. The cross sectional contour of the base of the recess corresponds substantially to the curvature of the arm 31, with the result that the arm 31 will not be scored during the interval the latter is moved relative to the reduced portion 37 of the plunger. It will also be noted from Figure 8 that a spring 42 is provided at the free end of the arm 31 to limit the extent of rearward swinging movement of the mower arm 18 and also absorb any shock that may be introduced by this action of the arm.

The bracket 21 is shown in Figure 4 as supported on the tractor for swinging movement about the axis designated generally in this figure by the reference character 43. In detail, a rod 44 is received in axially spaced bored portions 44a and 44b of the bracket 21 and has one end secured to the bracket 21 by means of the fastener element 45. The opposite end portion of the rod 44 extends beneath the tractor to a position adjacent the side of the tractor opposite the side thereof upon which the mower arm 18 is located. The latter end of the rod 44 is provided with an upwardly extending projection 15 pivotally connected to the lower end of a bracket 46 by means of a pin 47 and the bracket, in turn, is fixed to the tractor by means of the fastener elements 48.

Cooperating with the rod 44 is a second rod 49 having the forward end secured to the underside of the bracket 21 in the manner shown in Figure 6 and having the rear end pivotally connected to the tractor by means of a bracket 50. It will be observed from Figure 6 that the bottom of the bracket 21 is provided with axially spaced depending projections 51 having aligned bores therethrough for receiving the forward end portion of the rod 49, and the latter is secured to the bracket 21 by means of the fastener element 52. In Figure 7 of the drawings, it will be noted that the rear end of the rod 49 is bent at an angle to the major axis of the rod, and the bracket 50 is provided with an enlargement 53 having a bore therethrough for receiving the inclined end portion of the rod 49. Referring again to Figure 4, it will be observed that the axis of the pivotal connection between the rear end of the rod 49 and the bracket 50 and the axis of the pin 47, connecting the rod 44 with the tractor, are aligned with the axis 43 so as to permit the bracket 21, together with the parts carried thereby, to be swung about the axis 43.

It has previously been stated that the mower arm 18 supports the blade 19 for reciprocation relative to the arm and, in the present instance, the blade 19 is reciprocated from the power take-off shaft 17 through the medium of the following mechanism: It will be observed from Figures 2 and 4 that the rear end of the power take-off shaft 17 is operatively connected to the corresponding end of a transmission shaft 55 journalled in the transmission casing 56 and having the forward end connected to the rear end of a propeller shaft 57 through the medium of a universal joint 58. The forward end of the propeller shaft 57 is connected to the rear end of the driven shaft 25 through the medium of the universal joint 59, and the forward end of the driven shaft 25 is connected to the blade 19 for reciprocating the latter. The connection comprises a crank 60 driven by the shaft 25 and connected to the inner end of the blade by means of a connecting rod 61.

In the present instance, the power take-off shaft 17 also operates through the transmission mechanism in the casing 56 to swing the mower arm 18 from the operative position shown in Figure 1 to an upright or inoperative position. As shown particularly in Figure 2, the shoe 20 is operatively connected to a power driven drum 62 through the medium of a cable 63 in a manner that rotation of the drum in one direction effects an upward swinging movement of the mower arm 18 and rotation of the drum in the opposite direction causes the mower arm to swing downwardly. With this in mind, reference will be made to Figures 11 and 12, wherein it will be noted that the drum 62 is secured to a shaft 64 journalled in the transmission casing 56 and having a worm gear 65 secured thereto. The worm gear 65 meshes with a worm 66 secured to a countershaft 67 having a pinion 68 at one end meshing with a pinion 69 freely rotatably mounted on the transmission shaft 55. At the opposite end of the countershaft 67 is a sprocket 70 connected to a sprocket 71 on the transmission shaft 55 through the medium of a suitable chain 72. The sprocket 71 is freely rotatably mounted on the transmission shaft 55 in axially spaced relationship to the pinion 69, and a suitable clutch member 73 is splined on the shaft 55 between these two members. The clutch member 73 is operated by a control rod 74 rotatably supported and having the upper end extending to a position where it may be conveniently grasped by the operator. The arrangement is such that rotation of the control rod 74 in opposite directions alternately engages the clutch member 73 with the pinion 69 and sprocket 71 to, in turn, drive the drum 62 in opposite directions.

Referring now more in detail to the particular arrangement of the cable 63, it will be noted that the forward end of this cable is secured to the upper end of a vertically extending bracket 75 having the lower end anchored to the shoe 20. As shown in Figure 1, the cable is reeved over a fixed abutment 76 on the upper end of the bracket 75 and is extended around an idler pulley 77 supported by the bracket 21. Upon reference to Figure 5, it will be noted that the idler pulley 77 is rotatably supported on a bracket 78 having an enlargement 79 extending between portions 44a and 44b of the bracket 21 and pivotally mounted on the rod 44 in a manner to permit free oscillation of the pulley 77 about the axis of the rod.

The cable 63 extends from the pulley 77 over a second pulley 80 rotatably supported on a bracket 81 which, in turn, is secured to the adjacent side of the tractor by means of the fastener elements 82. The cable extends rearwardly over the pulley 80 and is reeved around the drum 62 with one end thereof secured to the periphery of the drum.

It follows from the foregoing that the mower arm 18 may be readily raised and lowered by the power supplied by the power take-off shaft 17. It will also be noted that the cable 63 applies a force component against the pulley 77 in a general upward direction and since the pulley 77 is carried by the bracket 21, it follows that the latter will be suspended by the cable. In addition, attention is called to the fact at this point that the weight of the mower arm 18 is counterbalanced to some extent by means of a spring 83, shown in Figure 4 as having one end anchored to the bracket 46 and having the opposite end secured to the upper end of the bracket 75. This spring assists in supporting the weight of the mower arm 18 and thereby prevents the latter from dragging on the ground.

In order to provide for raising the bracket 21 about the axis 43, a hand lever 85 is pivotally supported at its lower end on the bracket 81 by means of the pin 86. Upon reference to Figure 2, it will be noted that the lower end of the lever is provided with an extension 87 projecting forwardly from the pivot 86 and connected to the bracket 21 by means of the chain 88. The arrangement is such that rearward movement of the hand lever 85 causes the bracket 21 to move upwardly about the axis 43. This rearward movement of the hand lever 85 is assisted by means of a counterbalancing spring 89 having the forward end connected to the lever 85 at a point above the pivot 86 and having the rear end suitably anchored on the tractor. In accordance with the present invention, the hand lever is maintained in any one of several adjusted positions by means of suitable ratchet mechanism, designated in Figure 3 by the reference character 90. The ratchet mechanism comprises a segment 91 having rack teeth successively engageable with a spring pressed plunger 92 carried by the lever 85 and actuated by means of the control member 93. The control member 93 is positioned in relatively close proximity to the grip end of the lever 85 so as to permit the plunger 92 to be conveniently disengaged from the rack teeth on the segment 91.

Thus, from the foregoing, it will be observed that I have provided a mower attachment for tractors composed of a relatively few number of parts capable of being inexpensively manufactured, assembled and installed as a unit on the tractor. It will further be observed from the foregoing description that the several parts of my improved mower attachment are so designed and constructed to withstand considerable hard usage over a long period of time without failure.

What I claim as my invention is:

1. In a mowing machine, a tractor, a mower arm at one side and disposed at substantially right angles to the tractor, a support for the arm, a member extending beneath the tractor with one end connected to the support and with the other end pivotally connected to the tractor at one side thereof intermediate the ends of the latter for swinging movement about an axis extending diagonally of the longitudinal center line of the tractor, a second member extending rearwardly from the support and having the rear end bent at an angle to assume a position with its axis in alignment with the axis of pivotal connection of the first member, and a bracket attached to the tractor at the rear thereof near the side of the tractor opposite the pivotal connection of the first member with the tractor and having a bearing for supporting the angularly bent portion of the second member on said diagonal axis.

2. In a mowing machine, a tractor, a bracket at one side of said tractor, means carried by the tractor for supporting the bracket for swinging movement about an axis extending diagonally across the underside of the tractor, a mower shoe, a mower arm secured at one end to said shoe and projecting laterally outward relative to the tractor, and a universal connection between the shoe and bracket permitting the arm to swing in an arc lying in a horizontal plane.

3. In a mowing machine, a tractor, a mower arm at one side and disposed at substantially right angles to the tractor, a mower shoe rigid with the arm, a bracket pivotally connected to the shoe and having axially spaced bored portions, a rod having one end received in the bored portions and secured to the bracket, means hingedly connecting the opposite end of the rod to the tractor for swinging movement of the rod in a vertical plane, a pulley pivotally mounted on the rod between the bored portions of the bracket, and means cooperating with the pulley to suspend the bracket from the tractor.

4. In a mowing machine, a tractor, a mower arm at one side and disposed at substantially right angles to the tractor, a mower shoe rigid with said arm, a bracket pivotally connected to the shoe and having axially spaced bored portions, a rod received in the bored portions and secured at one end to the bracket, means pivotally connecting the opposite end of the rod to the tractor to permit vertical swinging movement of the bracket, a pulley mounted on the rod between the spaced bored portions of the bracket, and a cable extending around the underside of the pulley and anchored to the shoe.

5. In a mowing machine, a tractor, a mower arm at one side and disposed at substantially right angles to the tractor, a mower shoe rigid with said arm, a bracket pivotally connected to the shoe and having axially spaced bored portions, a rod received in the bored portions and secured at one end to the bracket, means pivotally connecting the opposite end of the rod to the tractor to permit vertical swinging movement of the bracket, a pulley mounted on the rod between the spaced bored portions of the bracket, a cable extending around the underside of the pulley and anchored to the shoe, and means connected to the opposite end of the cable for operating the latter to swing the arm relative to the bracket and having the additional function of cooperating with the cable to suspend the bracket from the tractor.

6. In a mowing machine, a tractor, a bracket supported on one side of the tractor for swinging movement in a vertical plane, a pulley carried by said bracket, a mower shoe pivoted to the bracket for swinging movement relative thereto in a vertical plane, a pulley carried by the tractor above the pulley aforesaid, means for swinging the shoe in a vertical plane including a cable having one end fixed to the mower shoe, having a portion extending around the underside of the first pulley and over the second pulley, a revoluble drum connected to the opposite end of the cable, and power driven means for selectively rotating the drum in opposite directions.

7. In a mowing machine, a tractor, a bracket supported on one side of the tractor for swinging movement in a vertical plane, a pulley carried by said bracket, a mower shoe pivoted to the bracket for swinging movement relative thereto in a vertical plane, a pulley carried by the tractor above the first pulley, means for swinging the shoe in a vertical plane including a cable having one end fixed to the mower shoe, having a portion extending around the underside of the first pulley and over the second pulley, and irreversible drive mechanism for actuating the cable.

8. In a mowing machine, a tractor, a bracket supported on one side of the tractor for swinging movement in a vertical plane, a pulley carried by said bracket, a mower shoe pivoted to the bracket for swinging movement relative thereto in a vertical plane, a pulley carried by the tractor above the first pulley, means for swinging the shoe in a vertical plane including a cable having one end fixed to the mower shoe, having a portion extending around the underside of the first pulley and over the second pulley, a revoluble drum connected to the opposite end of the cable, irreversible drive mechanism operatively connected to the drum, and power driven means for selectively rotating the drum in opposite directions through said irreversible drive mechanism.

9. In a mowing machine, a tractor, a bracket supported on one side of the tractor for swinging movement in a vertical plane, a mower shoe pivoted to the bracket for swinging movement relative thereto in a vertical plane, a pulley carried by the bracket, a pulley carried by the tractor above the first pulley, means for swinging the shoe in a vertical plane relative to the bracket including a revoluble drum carried by the tractor in rear of the second pulley, a cable connected to the shoe, reeved under the first pulley, reeved over the second pulley and connected to said drum, and power driven means for selectively rotating the drum in opposite directions.

10. In a mowing machine, a tractor, a bracket supported on the tractor at one side thereof, a mower shoe pivotally connected to the bracket for vertical swinging movement relative thereto, and a counterbalancing spring having one end anchored on the tractor and having the opposite end secured to the mower shoe at a point positioned above and laterally outward of the pivotal connection of the shoe with the bracket.

11. In a mowing machine, a tractor, a bracket supported from the tractor, a mower shoe beside the bracket, a universal connection between the shoe and bracket, a mower arm secured to the shoe, a blade carried by the arm, a driving connection between the tractor and blade including a transmission shaft, a propeller shaft driven by the transmission shaft, a crankshaft extending axially of the universal connection and driven by the propeller shaft, and a pitman driven by the crankshaft and connected to the blade, and means for swinging the mower shoe and arm about said universal connection relative to the bracket including a countershaft driven by the transmission shaft, a drum driven by the countershaft, and a cable connected to said drum and mower arm.

12. In a mowing machine, a tractor having a power take-off shaft, a mower bar supported from the tractor, a sickle bar carried by said mower bar, means for driving the sickle bar from the power take-off shaft including a transmission shaft operatively connected to the power take-off shaft, a propeller shaft connected to the transmission shaft, a crankshaft connected to the propeller shaft and a pitman connected to said crankshaft and sickle bar, and means for swinging the mower bar relative to the tractor including a countershaft, a clutch for operatively connecting the countershaft to the transmission shaft, a shaft operatively connected to the countershaft, a winding drum fixed to the last mentioned shaft, and a cable terminally connected to said drum and mower bar.

13. In a mowing machine, a tractor, brackets secured to said tractor at opposite sides thereof, one substantially midway the ends of the tractor, the other adjacent the rear end of the tractor, a bracket substantially in transverse alignment with the first mentioned bracket and substantially in longitudinal alignment with the second mentioned bracket, supporting rods extending at substantially right angles from the third mentioned bracket and pivotally connected to the first two mentioned brackets about an axis extending diagonally of the longitudinal center line of the tractor, a mower shoe pivotally connected to the third mentioned bracket, and a mower arm secured to said shoe and projecting laterally outward relative to said tractor.

14. In a mowing machine, a tractor, a bracket at one side of and movable in a vertical arc relative to said tractor, a mower arm carried by the bracket, and means for supporting the bracket from the tractor including two rods disposed at substantially right angles to each other and extending respectively across and lengthwise of the tractor, the rod extending across the tractor being connected at one end to the bracket and pivotally connected at its other end to the tractor at the side thereof farthest away from the bracket, the rod extending lengthwise of the tractor being connected at one end to the bracket and being pivotally connected at its other end to the tractor at the side thereof nearest the bracket, the pivotal connections between the rods and tractor being in alignment about an axis extending diagonally across the longitudinal center line of the tractor.

15. In a mowing machine, a tractor, a bracket supported on the tractor at one side thereof, a mower shoe pivotally connected to said bracket for vertical swinging movement relative thereto, a bracket supported on the tractor at the other side thereof, and a counterbalancing spring having one end anchored to the last mentioned bracket and having its opposite end secured to the mower shoe at a point above and laterally outward of the pivotal connection of the shoe with the first mentioned bracket.

16. In a mowing machine, a tractor, a bracket mounted at one side of the tractor for vertical swinging movement relative thereto, a mower shoe pivotally connected to said bracket for vertical swinging movement relative thereto, a bracket fixed to the tractor at the other side thereof, and a counterbalancing spring having one end anchored to the last mentioned bracket and having its other end secured to the mower shoe at a point above and laterally outward of the pivotal connection of the shoe with the first mentioned bracket.

17. In a mowing machine, a tractor, a bracket supported on the tractor at one side thereof, a mower shoe pivotally connected to said bracket for vertical swinging movement relative thereto, a bracket supported on the tractor at the other side thereof, an upright bracket fixed to the mower shoe at a point laterally outward of the pivotal connection of the shoe with the first mentioned bracket and having its upper end disposed above said pivotal connection, and a counterbalancing spring terminally connected to the second and third mentioned brackets, the connection between said spring and the third mentioned bracket being at the upper end of the latter.

18. In a mowing machine, a tractor, a bracket at one side of and movable in a vertical arc relative to the tractor, a mower arm carried by the bracket, and supporting means for the bracket pivotally connected to the tractor at opposite sides thereof, said pivotal connections being at spaced points longitudinally of the tractor and being in alignment about an axis extending diagonally across the longitudinal center line of the tractor.

ROBERT W. WAGNER.